(12) United States Patent
Hatfield

(10) Patent No.: US 11,603,069 B2
(45) Date of Patent: Mar. 14, 2023

(54) AIRBAG COVER EMBLEM COUPLING METHODS AND RELATED ASSEMBLIES

(71) Applicant: Autoliv ASP, Inc., Ogden, UT (US)

(72) Inventor: Mark S. Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/353,580

(22) Filed: Jun. 21, 2021

(65) Prior Publication Data
US 2022/0402453 A1   Dec. 22, 2022

(51) Int. Cl.
*B60R 21/215*   (2011.01)
(52) U.S. Cl.
CPC .. *B60R 21/215* (2013.01); *B60R 2021/21543* (2013.01)
(58) Field of Classification Search
CPC ................. B60R 21/215; B60R 21/21543
See application file for complete search history.

(56) References Cited

U.S. PATENT DOCUMENTS

| | | | | |
|---|---|---|---|---|
| 5,851,022 A | * | 12/1998 | Yamamoto | B60R 21/21656 280/728.3 |
| 7,533,899 B2 | * | 5/2009 | Sauer | B60R 21/2165 280/728.3 |
| 8,459,713 B2 | * | 6/2013 | Sella | G09F 7/18 296/1.08 |
| 10,814,819 B2 | * | 10/2020 | Hatfield | B60R 21/203 |
| 2004/0174002 A1 | * | 9/2004 | Sauer | B60R 21/2165 280/728.3 |
| 2010/0102538 A1 | * | 4/2010 | Paxton | B60Q 3/283 428/31 |
| 2011/0100155 A1 | * | 5/2011 | Jenny | B60R 13/005 74/552 |
| 2012/0030980 A1 | * | 2/2012 | Sella | B60R 21/215 29/432 |
| 2019/0351860 A1 | * | 11/2019 | Ohki | B60Q 3/20 |
| 2020/0062208 A1 | * | 2/2020 | Hatfield | B60R 21/2037 |
| 2021/0221319 A1 | * | 7/2021 | Harris | B32B 5/18 |

* cited by examiner

*Primary Examiner* — Barry Gooden, Jr.
(74) *Attorney, Agent, or Firm* — Matthew D. Thayne; Thayne and Davis LLC

(57) ABSTRACT

Airbag covers having emblems and related methods for coupling emblem elements to airbag covers. In some implementations, a fastening member coupled to an emblem element may be inserted through an opening formed within an airbag cover. The emblem element may be secured to the airbag cover by reshaping at least a portion of the fastening member using a LASER welding process.

13 Claims, 3 Drawing Sheets

AIRBAG COVER EMBLEM COUPLING METHODS AND RELATED ASSEMBLIES

SUMMARY

Several methods are used for coupling an emblem, such as a design, symbol, logo, and/or text, to an airbag cover, such as an airbag cover used in connection with either a driver-side or passenger-side airbag cushion. However, the present inventors have noted that current methodologies result in vulnerabilities to detachment of such emblems, particularly during airbag deployment.

The present inventors have therefore determined that it would be desirable to provide systems and methods that overcome one or more of the limitations of the prior art by improving the coupling means to inhibit detachment. Thus, in some implementations, the inventive concepts disclosed herein may be used to secure one or more fastening pins or other fastening members coupled with one or more emblem elements, such as decorative rings, a vehicle logo, or another decorative emblem positioned on a vehicle steering wheel via a LASER welding process. Additionally, or alternatively, some embodiments may comprise use of a novel sealing plate that may be used, either in conjunction with a LASER welding process or another process involving application of energy to reshape the fastening pin(s), to provide a more secure coupling between the emblem element(s) and the airbag cover.

In a more particular example of a method for coupling an emblem element to an airbag cover, the method may comprise inserting a fastening member, such as a pin, coupled to an emblem element through an opening formed within an airbag cover; and securing the emblem element to the airbag cover by reshaping at least a portion of the fastening member using a LASER welding process.

Some implementations may further comprise use of a sealing plate. For example, some implementations may further comprise welding the sealing plate to the fastening member on a rear surface of the airbag cover using a LASER. In some such implementations and related embodiments, the sealing plate may comprise a recess configured to receive the fastening member. The step of securing the emblem element to the airbag cover may then comprise inserting the fastening member into the recess; and, in some implementations, using a LASER to reshape and combine material from the sealing plate with material from the fastening member to secure the emblem element to the airbag cover.

In some implementations and related embodiments, the sealing plate may comprise a fastening member mounting region and/or a cavity, which cavity may extend about a perimeter of the fastening member mounting region. The step of securing the emblem element to the airbag cover may then comprise aligning the fastening member with the fastening member mounting region and/or using a LASER to reshape material from the fastening member into the cavity to form a barrier at least partially filling the cavity and extending about an axis of the fastening member.

In some embodiments, the airbag cover may comprise a barrier extending from an inner surface of the airbag cover about a perimeter of the opening, which barrier may be part of the airbag cover or may be coupled to the airbag cover by way of a sealing plate. In some related implementations, the step of securing the emblem element to the airbag cover may comprise reshaping the fastening member using a LASER such that the fastening member contacts at least a portion of the barrier.

In some implementations, the step of securing the emblem element to the airbag cover may comprise reshaping the fastening member and reshaping the barrier to combine material from the fastening member with material from the barrier using a LASER.

The fastening member may comprise the same material as the airbag cover or may comprise a material distinct from the material of the airbag cover. Preferably, the material of the fastening member and the material of the airbag cover adjacent to the fastening member both comprise a material compatible for LASER welding, and may therefore comprise materials distinct from typical materials used for these elements in an airbag cover of the prior art. In addition, in some embodiments, some or all of the material of the cover through which the fastening member fastens need not be reshaped and/or involved in the LASER welding process.

In some embodiments and implementations, the fastening member may comprise a coating, which coating, such as graphite or vinyl chloride, which may, in some cases, further facilitate a stable coupling by providing a material that is more readily reshaped and/or recombined with material from the airbag cover. In some embodiments and implementations, the coating material, when used, may be configured to prevent, or at least substantially prevent, chrome and/or other materials used in a chrome plating process from adhering to the fastening members.

The materials of the fastening member and airbag cover may comprise, for example, a thermoplastic polymer. In some embodiments and related implementations, the airbag cover may comprise a thermoplastic olefin, and the fastening member may comprise a polycarbonate alloy.

In another example of a method for coupling an emblem element to an airbag cover, the method may comprise inserting a plurality of fastening members through a respective plurality of holes formed within an airbag cover; and thermally reshaping each of the plurality of fastening members using a LASER to secure an emblem element to the airbag cover.

Some implementations may further comprise thermally reshaping at least a portion of the airbag cover adjacent to each of the plurality of holes to combine material from the airbag cover with material from each of the plurality of fastening members.

Some implementations may further comprise coupling a sealing plate to a rear surface of the airbag cover and to at least a subset (in some implementations, all) of the plurality of fastening members. In some implementations, a single sealing plate may be used. Alternatively, a plurality of sealing plates may be used. For example, a separate sealing plate may be used for each fastening member in some implementations.

In some implementations, the step of coupling a sealing plate to the rear surface of the airbag cover may comprise welding the sealing plate to the at least a subset of the plurality of fastening member on the rear surface of the airbag cover using a LASER.

In an example of an airbag module according to some embodiments, the module may comprise an airbag cover and one or more emblem elements coupled to a front surface of the airbag cover. A sealing plate may be coupled to a rear surface of the airbag cover. One or more fastening members may extend from the one or more emblem elements through a corresponding one or more openings in the airbag cover to secure the emblem element to the airbag cover. In some embodiments, each of the one or more fastening members may be integrally coupled with the sealing plate. In some embodiments, this integral coupling may be accomplished by LASER welding or otherwise reshaping and recombining material from the fastening member(s) and/or the airbag cover with the sealing plate.

Some embodiments may further comprise one or more barriers extending from an inner surface of the airbag cover about a perimeter of the opening. Each of the one or more barriers may be integrally coupled with a fastening member of the one or more fastening members, such as, for example, by an integral coupling method, such as LASER WELDING.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to coupling emblem elements with airbag modules, such as with airbag covers. In some embodiments, a plurality of fastening pins or other fastening members may be inserted through a corresponding plurality of holes formed in the airbag cover or another suitable portion of the airbag module. Preferably these fastening members are smaller in cross-sectional shape and/or size than their corresponding holes. During processing, the fastening members may then be reshaped to, preferably, fill their respective holes entirely to secure the emblem to the airbag module.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
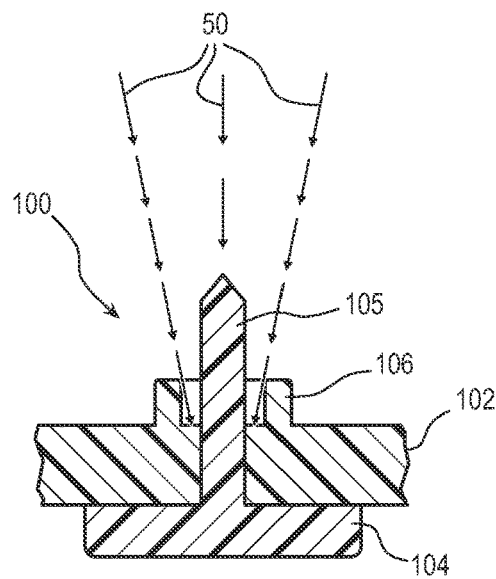
FIG. 1A is a cross-sectional view of an airbag cover and an emblem element according to some embodiments during a process of coupling the emblem element to the airbag cover.

FIG. 1A depicts a portion of an airbag module 100, which may be a driver-side airbag module for a steering wheel, for example. Airbag module 100 comprises a cover 102. An emblem 104, which may include, for example, a design, logo, alphanumeric text, or the like, is coupled with cover 102 on an exterior surface of cover 102. Emblem 104 is coupled with cover 102 via one or more fastening pins 105 or other fastening members, each of which may extend through a corresponding opening formed in cover 102.

As also shown in FIG. 1A, cover 102 may, in some embodiments, further comprise a barrier 106 that extends from an inner surface of airbag cover 102. As discussed in greater detail below, barrier 106 may extend about an entire perimeter of each opening formed in cover 102 on the distal/inner surface of each such opening and may be used to facilitate desired shaping of fastening pins 105 during processing and/or may be used to provide a more secure and strong fixation of emblem 104. Barrier 106 may be continuous or, in other embodiments, may have designated breaks to further facilitate processing, e.g., by allowing hot air to escape around the base, while still providing additional security to a formed knob of the finished piece, which may contact the barrier 106, as shown in FIG. 1B.

FIG. 1A depicts fastening pin 105 being welded by LASER beams 50, which may heat the material of the fastening pin 105 to allow it to be reshaped. In some inventive manufacturing methods, surrounding material from cover 102 may also be heated and reshaped during this process. For example, material of barrier 106 adjacent to pin 105 may also be heated and reshaped. Of course, as discussed in greater detail below, it is not necessary that a barrier 106 be used. Thus, it is contemplated that the material along the inner surface of cover 102 may be impinged with LASER beams 50 as an alternative, or in addition to, that of barrier 106 in some implementations. Similarly, it is contemplated that the diameter of pin 105 in its pre-welded configuration may be slightly smaller than the diameter of the opening in cover 102 through which it extends in some embodiments. Thus, the material defining this hole (or holes; again, typically multiple holes are provided even though only one is shown in the figure) may be impinged with LASER beams 50 if desired.

Figure 1B:
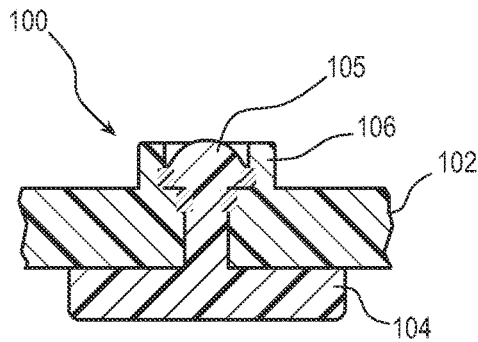
FIG. 1B depicts the airbag cover of FIG. 1A following coupling of a fastening pin of the emblem element to the cover.

As those of ordinary skill in the art will appreciate, a tool (not shown) may be used to reshape fastening pin 105 from the shape depicted in FIG. 1A to the shape depicted in FIG. 1B. In some embodiments and implementations, this tool may be used in combination with energy provided by LASER beams 50 to weld pin 105 to cover 102.

In some embodiments and implementations, material making up the pin(s) 105 may be combined with material making up the cover 102 during the LASER welding process, as shown in FIG. 1B. The material making up the pin(s) 105 may be identical to the material making up cover 102 in some embodiments, which may make the process of recombining them to rigidly mount the emblem element 104 to the cover 102 easier. However, it is contemplated that, in other embodiments, pin(s) 105 may comprise a distinct and/or dissimilar material relative to cover 102. For example, in some embodiments, the pin(s) 105 may comprise a polycarbonate or polycarbonate alloy, such as PC/ABS. By contrast, cover 102 may comprise, in some embodiments, another preferably thermoplastic material, such as a thermoplastic olefin material.

Figure 2A:
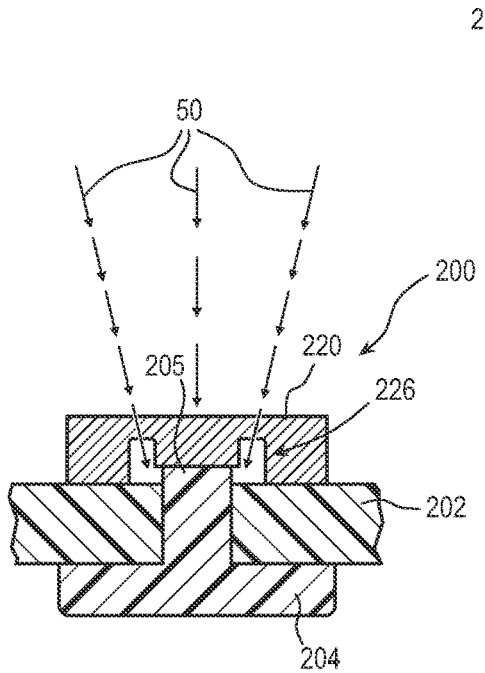
FIG. 2A is a cross-sectional view of another airbag cover showing a sealing cover used during an alternative process of coupling an emblem element to the cover.

FIG. 2A depicts a cross-sectional view of another interface for coupling an emblem 204 to an airbag cover 202 according to some embodiments. As with FIG. 1A, the configuration depicted in FIG. 2A is in a condition prior to a subsequent manufacturing/processing step in which fastening pin 205 is reshaped, as discussed below.

Figure 2B:
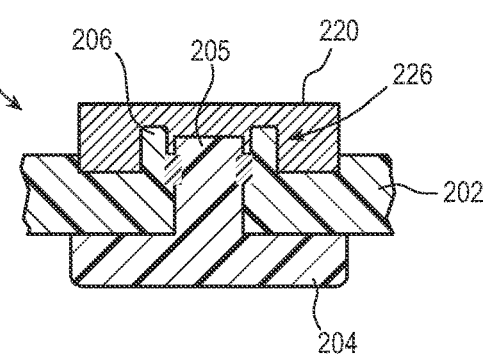
FIG. 2B depicts the airbag cover of FIG. 2A following the coupling process.

The assembly shown in FIG. 2A comprises a sealing plate 220 that is applied to the inner/distal surface of cover 202 to facilitate the process of rigidly, and preferably non-releasably, coupling sealing plate emblem 204 to cover 202. As shown in this figure, plate 220 may comprise one or more features to facilitate this coupling. In the depicted embodiment, this feature comprises a cavity 226 configured to be positioned adjacent to the inner surface of cover 202 that may be configured to receive reshaped material from the pin 205 and/or plate 202 to facilitate a more secure coupling. Cavity 226 may be configured to form a barrier 206, as shown in FIG. 2B. Although only a cross-sectional view is depicted, it should be understood that, like barrier 106, barrier 206 may extend fully, or at least substantially fully, about a perimeter of pin 205. It can also be seen in FIGS. 2A and 2B that there may be a region of plate 220, such as a recess, within the perimeter of cavity 226 that may be configured to receive and/or contact the tip of pin 205.

Figure 2C:
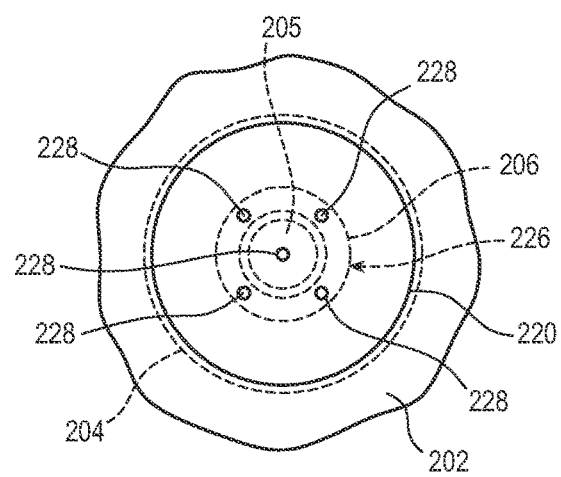
FIG. 2C is a plan view of the airbag cover and sealing plate.

As with the embodiment of FIGS. 1A and 1B, the embodiment of FIGS. 2A-2C may, in some embodiments and implementations, further comprise combining material from the pin 205 with material from the plate 202, as shown in FIG. 2B, by application of LASER beams 50 during a LASER welding process. However, it is contemplated that, in alternative embodiments and implementations, other reshaping processes may be used that need not involve use of LASERs. For example, when a sealing plate is used, such as sealing plate 220, it may be possible to use a heat gun, or another means of applying energy to pin 205, to facilitate a reshaping process to couple pin 205 to plate 220 and thereby couple emblem 204 to cover 202.

However, in preferred implementations and embodiments involving use of LASER welding, it may be desirable to provide one or more openings to allow the LASER beams to pass through the distal surface of plate 220 and impinge on pin 205 and/or cover 202. Thus, as shown in the plan view of FIG. 2C, some embodiments may comprise openings 228 that may lead and provide access to, for example, cavity 226 and/or fastening pin 205.

Figure 3A:
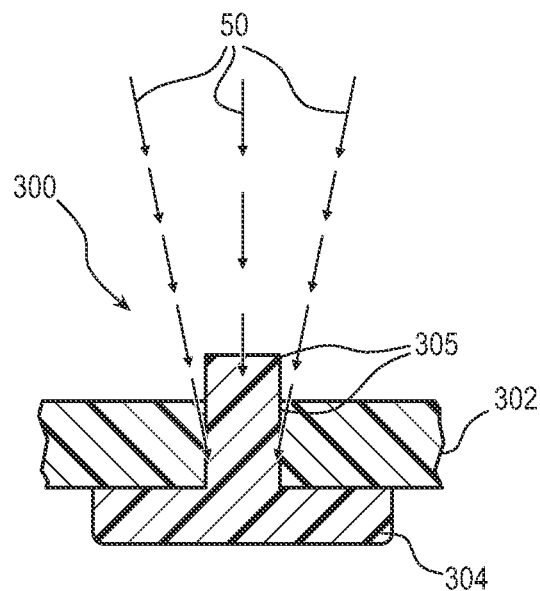
FIG. 3A is a cross-sectional view of another emblem element being welded to an airbag cover.
Figure 3B:
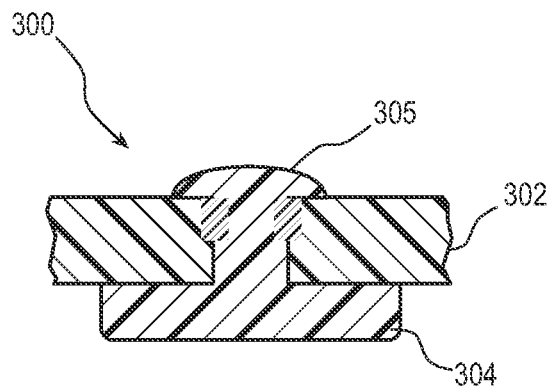
FIG. 3B depicts the airbag cover of FIG. 3A following the welding process.

FIGS. 3A and 3B depicts another embodiment of an airbag module 300 and corresponding process for welding a pin 305 to an airbag cover 302 to secure an emblem element 302 to the airbag cover 302. In this embodiment, airbag cover 302 lacks a barrier. Thus, pin 305 may be inserted through the opening formed in airbag cover 302 and then reshaped and/or welded, preferably using LASER beams 50. As shown in FIG. 3B, this process may, in some implementations, form an enlarged knob at the distal end of pin 305. In addition, as also illustrated in this figure, it may be desirable in some implementations to perform the welding process so as to recombine material from the pin 305 with material from the cover 302 to form a more secure attachment.

Figure 4A:
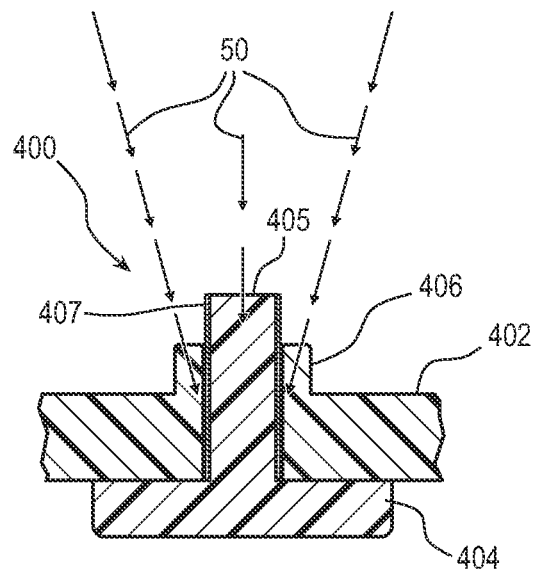
FIG. 4A is a cross-sectional view of an airbag cover and emblem element according to still other embodiments during a process of coupling the emblem element to the airbag cover.
Figure 4B:
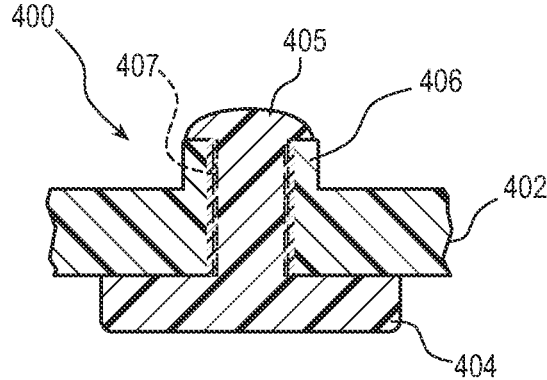
FIG. 4B depicts the airbag cover of FIG. 4A following the coupling process.

Still another example of a module 400 is shown in FIGS. 4A and 4B. In this embodiment, again, a fastening pin 405 of an emblem element 404 is inserted through an opening in the airbag cover 402 and is used, preferably via a LASER welding process, to secure the emblem element 404 to the cover 402. However, in this embodiment, the fastening pin 405 comprises a coating 407, such as a graphite or vinyl chloride material, for example, which may facilitate the process. Thus, as shown in FIG. 4B, the coating 407 may, following absorption of energy from LASER beams 50 or, alternatively, another welding or other energy delivery, bond to one or more of the surfaces of the airbag cover 402 to facilitate a secure attachment. In some embodiments and implementations, as previously mentioned, material may be recombined from two or more sources during this process. For example, material from coating 407, pin 405, and/or cover 402 may be recombined after being reshaped by receipt of the aforementioned energy. Optionally, a barrier 406 may be provided on the inner surface of airbag cover 402.

Figure 5A:
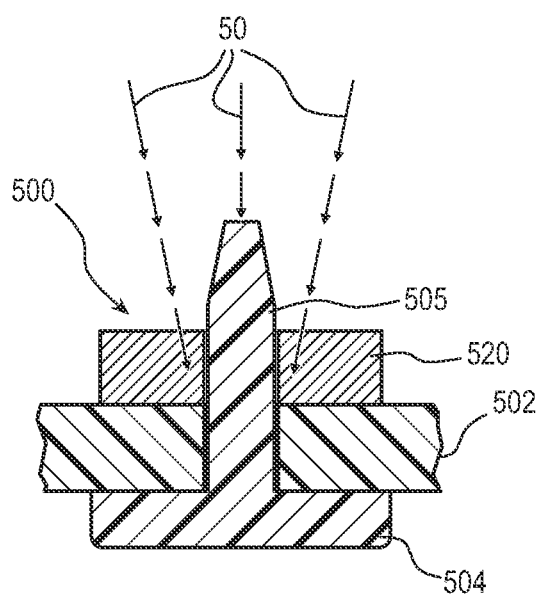
FIG. 5A is a cross-sectional view of another airbag cover showing an alternative sealing cover used during a process of coupling an emblem element to the cover.
Figure 5B:
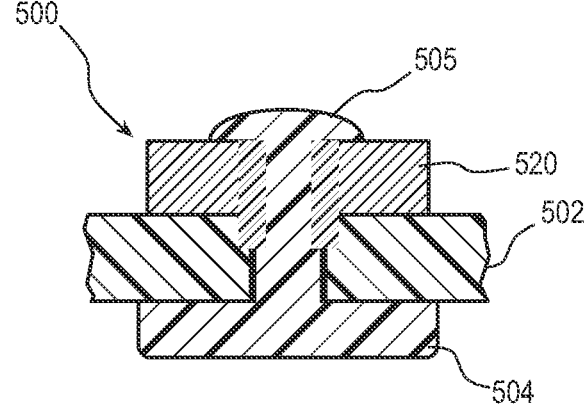
FIG. 5B depicts the airbag cover of FIG. 5A following the coupling process.

Yet another example of a module 500 is shown in FIGS. 5A and 5B. In this embodiment, a fastening pin 505 of an emblem element 504 is inserted through an opening in the airbag cover 502 and also through an opening in an alternative sealing plate 520. Again, pin 505 may be reshaped, such as via a LASER welding process, to secure the emblem element 504 to the cover 502. In some embodiments and implementations, as previously mentioned, material may be recombined from two or more sources during this process. For example, material from plate 520, pin 505, and/or cover 502 may be recombined after being reshaped by receipt of the aforementioned energy. In embodiments in which LASER beams 50 are used, it is contemplated that various openings may be formed in plate 520, if desired, to facilitate access to regions of the plate 520, pin 505, and/or cover 502 not otherwise readily accessible.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An airbag module, comprising:
an airbag cover;
an emblem element coupled to a front surface of the airbag cover;
a sealing plate coupled to a rear surface of the airbag cover; and
one or more fastening members extending from the emblem element through a corresponding one or more openings in the airbag cover to secure the emblem element to the airbag cover, wherein each of the one or more fastening members is integrally coupled with the sealing plate; and
one or more barriers extending from and directly coupled with an inner surface of the airbag cover about a perimeter of a respective opening of the one or more openings wherein each of the one or more barriers is integrally coupled with a fastening member of the one or more fastening members.

2. The airbag module of claim 1, wherein each of the one or more barriers extends integrally from the inner surface of the airbag cover.

3. The airbag module of claim 1, wherein the sealing plate is LASER welded to at least one of the one or more fastening members on the rear surface of the airbag cover.

4. The airbag module of claim 1, wherein the sealing plate comprises a recess configured to receive the one or more fastening members.

5. The airbag module of claim 1, wherein the sealing plate comprises a fastening member mounting region and a cavity extending about a perimeter of the fastening member mounting region.

6. The airbag module of claim 5, wherein at least one of the one or more barriers is formed within the cavity.

7. The airbag module of claim 1, wherein each of the one or more fastening members comprises a pin.

8. The airbag module of claim 1, wherein each of the one or more fastening members comprises a first material, and wherein the airbag cover comprises a second material distinct from the first material.

9. The airbag module of claim 8, wherein each of the one or more fastening members is integrally coupled with the airbag cover along one or more regions in which the first material is combined with the second material.

10. The airbag module of claim 8, wherein the first material and the second material both comprise a thermoplastic polymer.

11. The airbag module of claim 10, wherein the first material comprises a thermoplastic olefin, and wherein the second material comprises a polycarbonate alloy.

12. The airbag module of claim 1, wherein each of the one or more fastening members comprises a coating.

13. The airbag module of claim 12, wherein the coating comprises at least one of: graphite and/or vinyl chloride.

* * * * *